US012366783B2

(12) United States Patent
Zhao et al.

(10) Patent No.: US 12,366,783 B2
(45) Date of Patent: Jul. 22, 2025

(54) LIQUID CRYSTAL HANDWRITING BOARD

(71) Applicants: Beijing BOE Optoelectronics Technology Co., Ltd., Beijing (CN); BOE Technology Group Co., Ltd., Beijing (CN); Shandong Lanbeisite Educational Equipment Group, Shandong (CN)

(72) Inventors: Yu Zhao, Beijing (CN); Xiaojuan Wu, Beijing (CN); Dawei Feng, Beijing (CN); Zhiqiang Yu, Beijing (CN); Yang Ge, Beijing (CN); Jiaxing Wang, Beijing (CN); Yao Bi, Beijing (CN); Mengxun Yang, Beijing (CN); Jian Wang, Beijing (CN); Xiuliang Wang, Beijing (CN); Tianyang Han, Beijing (CN)

(73) Assignees: Beijing BOE Optoelectronics Technology Co., Ltd., Beijing (CN); BOE Technology Group Co., Ltd., Beijing (CN); Shandong Lanbeisite Educational Equipment Group, Shandong (CN)

(*) Notice: Subject to any disclaimer, the term of this patent is extended or adjusted under 35 U.S.C. 154(b) by 0 days.

(21) Appl. No.: 18/698,331

(22) PCT Filed: May 24, 2023

(86) PCT No.: PCT/CN2023/096045
§ 371 (c)(1),
(2) Date: Apr. 3, 2024

(87) PCT Pub. No.: WO2023/231863
PCT Pub. Date: Dec. 7, 2023

(65) Prior Publication Data
US 2025/0053052 A1    Feb. 13, 2025

(30) Foreign Application Priority Data

May 31, 2022   (CN) .......................... 202210611074.3

(51) Int. Cl.
*G02F 1/1368* (2006.01)
*G02F 1/1333* (2006.01)
(Continued)

(52) U.S. Cl.
CPC ...... *G02F 1/1368* (2013.01); *G02F 1/133305* (2013.01); *G02F 1/13338* (2013.01); *G02F 1/13624* (2013.01); *G02F 1/1391* (2013.01)

(58) Field of Classification Search
CPC ............. G02F 1/1368; G02F 1/133305; G02F 1/13338; G02F 1/13624; G02F 1/1391;
(Continued)

(56) References Cited

U.S. PATENT DOCUMENTS

| | | | |
|---|---|---|---|
| 2003/0071958 A1* | 4/2003 | Wu | G02F 1/133377 |
| | | | 349/156 |
| 2017/0219865 A1* | 8/2017 | Gu | G02F 1/13439 |
| 2023/0185143 A1* | 6/2023 | Wu | G02F 1/13394 |
| | | | 349/33 |

* cited by examiner

*Primary Examiner* — Kevin Quarterman
(74) *Attorney, Agent, or Firm* — IPro, PLLC

(57) ABSTRACT

A liquid crystal handwriting board is provided. The liquid crystal handwriting board includes a first substrate and a second substrate that are disposed opposite to each other, and a liquid crystal layer disposed between the first substrate and the second substrate; wherein the first substrate includes: a first base substrate, and a transistor and a pixel electrode disposed at a side, proximal to the second substrate, of the first base substrate, the transistor being electrically connected to the pixel electrode; wherein the transistor includes a channel region, wherein a ratio of an area of the channel region to an on-current of the transistor is (Continued)

greater than a ratio of an area of a channel region of a reference transistor to an on-current of the reference transistor.

20 Claims, 6 Drawing Sheets

(51) Int. Cl.
  *G02F 1/1362* (2006.01)
  *G02F 1/139* (2006.01)
(58) Field of Classification Search
  CPC ........ G02F 1/13; G02F 1/1343; G02F 1/1362; G02F 1/139
  See application file for complete search history.

LIQUID CRYSTAL HANDWRITING BOARD

CROSS-REFERENCE TO RELATED APPLICATIONS

This application is a U.S. national stage of international application No. PCT/CN2023/096045, filed on May 24, 2023, which claims priority to Chinese Patent Application No. 202210611074.3, filed on May 31, 2022, and entitled "LIQUID CRYSTAL HANDWRITING BOARD," the disclosures of which are herein incorporated by reference in their entireties.

TECHNICAL FIELD

The present disclosure relates to the field of display technologies, and in particular, relates to a liquid crystal handwriting board.

BACKGROUND

A handwriting board is an electronic device for achieving writing and drawing. A liquid crystal handwriting board has advantages of low power consumption and clear handwriting, and thus has occupied much market share in recent years.

SUMMARY

Embodiments of the present disclosure provide a liquid crystal handwriting board. The technical solutions are as follows.

A liquid crystal handwriting board includes: a first substrate and a second substrate that are disposed opposite to each other, and a liquid crystal layer disposed between the first substrate and the second substrate, the liquid crystal layer including bistable liquid crystal molecules;
  wherein the first substrate includes: a first base substrate, and a transistor and a pixel electrode disposed at a side, proximal to the second substrate, of the first base substrate, the transistor being electrically connected to the pixel electrode;
  wherein the transistor includes a channel region, wherein a ratio of an area of the channel region to an on-current of the transistor is greater than a ratio of an area of a channel region of a reference transistor to an on-current of the reference transistor, the ratio of the area of the channel region of the reference transistor to the on-current of the reference transistor being 32.5.

In some embodiments, a length of the channel region of the transistor is N times a length of the channel region of the reference transistor, and a width of the channel region of the transistor is N times a width of the channel region of the reference transistor, wherein N is greater than one.

In some embodiments, N is less than or equal to two.

In some embodiments, the channel region of the transistor includes: a first sub-channel region and a second sub-channel region that are connected to each other, a length of the first sub-channel region is greater than a length of the second sub-channel region;
  wherein the length of the second sub-channel region is equal to the length of the channel region of the reference transistor; and a sum of a width-to-length ratio of the first sub-channel region and a width-to-length ratio of the second sub-channel region is equal to a width-to-length ratio of the reference transistor.

In some embodiments, the channel region of the transistor is U-shaped, one of the first sub-channel region and the second sub-channel region includes two sub-channel regions, and the two sub-channel regions are arranged at two sides of the other one of the first sub-channel region and the second sub-channel region.

In some embodiments, the two sub-channel regions are both strip-shaped, and the other one of the first sub-channel region and the second sub-channel region is U-shaped.

In some embodiments, a width W1 of the first sub-channel and a width W2 of the second sub-channel region satisfy the following relationship:

$$W1/M + W2 = W3,$$

wherein W3 represents a width of the channel region of the reference transistor, and M represents a ratio of the length of the first sub-channel region to the length of the channel region of the reference transistor, wherein M is greater than one.

In some embodiments, the transistor includes: K first sub-transistors connected in series, wherein each of the first sub-transistors includes a third sub-channel region, and the K third sub-channel regions are separately disposed, K being an integer greater than one;
  wherein a length of the third sub-channel region is equal to a length of the channel region of the reference transistor, and a width of the third sub-channel region is K times a width of the channel region of the reference transistor.

In some embodiments, each of the third sub-channel regions is strip-shaped.

In some embodiments, the channel region of the transistor is annular, a length of the channel region of the transistor is equal to a length of the channel region of the reference transistor, and a width of the channel region of the transistor is equal to a width of the channel region of the reference transistor.

In some embodiments, the channel region of the transistor is shaped as a square annular.

In some embodiments, the transistor includes: J second sub-transistors connected in parallel, wherein each of the second sub-transistors includes an annular fourth sub-channel region, and the J fourth sub-channel regions are separately disposed, J being an integer greater than one;
  wherein a length of the fourth sub-channel region is equal to a length of the channel region of the reference transistor, and a sum of widths of the J fourth sub-channel regions is equal to a width of the channel region of the reference transistor.

In some embodiments, the fourth sub-channel regions are equal in area, and the width of each of the fourth sub-channel regions is 1/J of the width of the channel region of the reference transistor.

In some embodiments, the fourth sub-channel region is shaped as a square annular.

In some embodiments, the on-current of the transistor has a same magnitude as the on-current of the reference transistor.

In some embodiments, the first substrate further includes: a gate line and a data line, wherein the gate line is electrically connected to a gate electrode of the transistor, and the data line is electrically connected to a first electrode of the transistor, wherein a second electrode of the transistor is electrically connected to the pixel electrode.

In some embodiments, the second substrate includes: a second base substrate and a common electrode disposed at a side, proximal to the first substrate, of the second base substrate, wherein one of the first base substrate and the second base substrate is a flexible base substrate; and the transistor is configured to: be turned on upon irradiation of target light, enable the data line connected to the transistor to apply a pixel voltage to the pixel electrode connected to the transistor, and create a voltage difference between the pixel electrode to which the pixel voltage is applied and the common electrode.

In some embodiments, the flexible base substrate is disposed at a writing side of the liquid crystal handwriting board.

In some embodiments, a difference value between the ratio of the area of the channel region of the transistor to the on-current of the transistor and the ratio of the area of the channel region of the reference transistor to the on-current of the reference transistor is greater than or equal to 1.8.

In some embodiments, the difference value between the ratio of the area of the channel region of the transistor to the on-current of the transistor and the ratio of the area of the channel region of the reference transistor to the on-current of the reference transistor is less than or equal to 80.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are further described in detail hereinafter with reference to the accompanying drawings.

For partially erasing the handwriting displayed on the liquid crystal handwriting board, a transistor sensitive to target light is required to be disposed in the liquid crystal handwriting board. In the case that the handwriting displayed on the liquid crystal handwriting board is erased by an erasing tool (such as an eraser capable of emitting the target light of a strong light intensity), the transistor is turned on upon irradiation of the target light, such that a voltage difference is formed between a pixel electrode connected to the transistor and a common electrode in the liquid crystal handwriting board, enabling the handwriting in a region irradiated by the target light to be erased.

However, the transistor in the liquid crystal handwriting board has a low sensitivity due to a small photosensitive area of the transistor, resulting in a poor erasing effect of the liquid crystal handwriting board.

Figure 1:
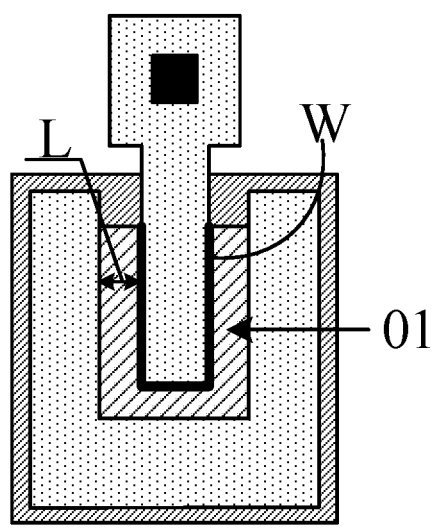
FIG. 1 is a top view of a transistor in a liquid crystal handwriting board according to the related art.

Referring to FIG. 1, FIG. 1 is a top view of a transistor in a liquid crystal handwriting board according to the related art. A photosensitive area of the transistor in the liquid crystal handwriting board is an area of a channel region 01 of the transistor, and the area of the channel region 01 of the transistor directly affects the sensitivity of the transistor.

In the related art, the channel region 01 of the transistor is generally U-shaped, and the channel region 01 of the transistor has a width W of 50 microns and a length L of 4 microns, i.e., a width-to-length ratio W/L of the channel region 01 of the transistor is 50/4. Therefore, the area of the channel region 01 of the transistor is only 325 square microns. That is, the area of the channel region 01 of the transistor is small, such that the transistor is difficult to turn on upon irradiation of target light, i.e., the liquid crystal handwriting board has low sensitivity, resulting in a poor erasing effect of the liquid crystal handwriting board.

Moreover, for turning on the transistor normally upon irradiation of the target light, a gate voltage applied to a gate electrode of the transistor needs to be increased. In the case that the gate voltage applied to the gate electrode of the transistor is large, the transistor may be turned on upon irradiation of ambient light of low light intensity, resulting in improper erasing on the liquid crystal handwriting board. Therefore, the erasing effect of the liquid crystal handwriting board is poor.

Figure 2:
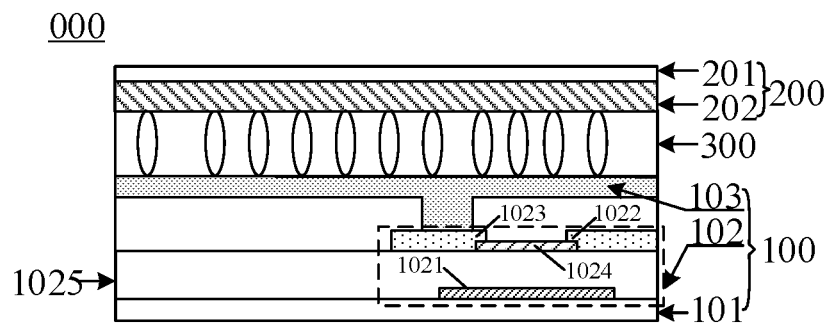
FIG. 2 is a structural schematic diagram of film layers of a liquid crystal handwriting board according to some embodiments of the present disclosure.
Figure 3:
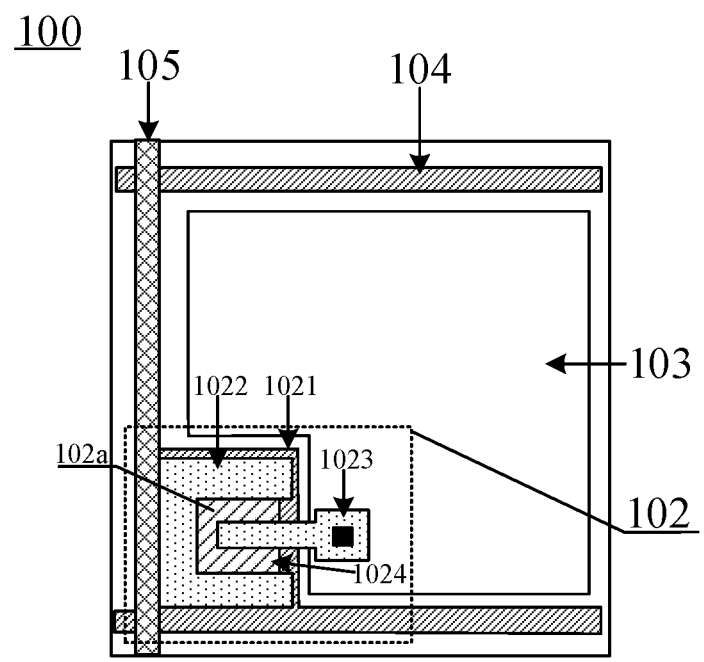
FIG. 3 is a top view of a first substrate in the liquid crystal handwriting board shown in FIG. 2.

Referring to FIG. 2 and FIG. 3, FIG. 2 is a structural schematic diagram of film layers of a liquid crystal handwriting board according to some embodiments of the present disclosure, and FIG. 3 is a top view of a first substrate in the liquid crystal handwriting board shown in FIG. 2. The liquid crystal handwriting board 000 includes: a first substrate 100 and a second substrate 200 that are disposed opposite to each other, and a liquid crystal layer 300 disposed between the first substrate 100 and the second substrate 200. The liquid crystal layer 300 includes bistable liquid crystal molecules, i.e., the liquid crystal layer 300 is a bistable liquid crystal layer.

In some embodiments, the first substrate 100 includes: a first base substrate 101, and a transistor 102 and a pixel electrode 103 disposed at a side, proximal to the second substrate 200, of the first base substrate 101, wherein the transistor 102 is electrically connected to the pixel electrode 103. In some embodiments, the second substrate 200 includes: a second base substrate 201, and a common electrode 202 disposed at a side, proximal to the first substrate 100, of the second base substrate 201. Here, the transistor 102 is a transistor that is sensitive to light. In the case that the transistor 102 is irradiated by the target light of a strong light intensity, the transistor 102 is turned on.

In some embodiments, as shown in FIG. 2, the transistor 102 includes: a gate electrode 1021, a first electrode 1022, a second electrode 1023, and an active layer 1024. In the transistor 102, both the first electrode 1022 and the second electrode 1023 overlap with the active layer 1024, and the active layer 1024 is insulated from the gate electrode 1021 through a gate insulating layer 1025. Here, the first electrode 1022 is one of a source electrode and a drain electrode, and the second electrode 1023 is the other one of the source electrode and the drain electrode. One of the source electrode and the drain electrode of the transistor 102 is electrically connected to the pixel electrode 103.

In the present disclosure, the active layer 1024 of the transistor 102 in the first substrate 100 includes a channel region 102*a*. The channel region 102*a* refers to a region of the active layer 1024 between a first region in which the active layer 1024 contacts the first electrode 1022 and a second region in which the active layer 1024 contacts the second electrode 1023.

Upon the transistor 102 being irradiated by the target light, carriers are generated in the channel region 102*a* of the transistor 102, and the first electrode 1022 and the second electrode 1023 of the transistor 102 are turned on by the carriers. It should be noted that the embodiments of the present disclosure are illustrated with the transistor 102 being a bottom-gate-type thin-film transistor. In other optional implementations, the thin-film transistor may also be a top-gate-type thin-film transistor, which is not limited in the embodiments of the present disclosure.

In the embodiments of the present disclosure, in the case that the liquid crystal handwriting board 000 is in a writing mode, the second substrate 200 in the liquid crystal handwriting board 000 is subjected to an externally applied pressure, and a portion of the bistable liquid crystal molecules in the liquid crystal layer 300 of the liquid crystal handwriting board 000 are transformed from a focal conic texture to a planar texture under the pressure. In this way, the liquid crystal molecules transformed into the planar texture reflect the light with a specific wavelength (for example, the green light) in the incident ambient light, such that the liquid crystal handwriting board displays handwriting.

In the case that the liquid crystal handwriting board 000 is in an erasing mode, an erasing tool (an eraser capable of emitting the target light of a strong light intensity) emits the target light to a region where handwriting exists in the liquid crystal handwriting board 000, and the transistor 102 in the liquid crystal handwriting board 000, which is irradiated by the target light, is turned on. In this way, a voltage difference is generated between the pixel electrode 103 connected to the transistor 102 and the common electrode 202 in the liquid crystal handwriting board 000. In this way, the bistable liquid crystal molecules in the region irradiated by the target light are rearranged under the voltage difference, i.e., the bistable liquid crystal molecules are transformed from the planar texture to the focal conic texture, such that the handwriting in the region irradiated by the target light is erased.

In the embodiments of the present disclosure, a ratio of an area S2 of the channel region 102*a* of the transistor 102 to an on-current of the transistor 102 is greater than a ratio of an area S1 of a channel region of a reference transistor to an on-current of the reference transistor. It should be noted that in the embodiments of the present disclosure, the area of the channel region of the transistor refers to an area of an orthographic projection of the channel region on the base substrate on which the transistor is disposed.

It should be further noted that the reference transistor is the transistor in the related art as described above, i.e., the reference transistor has the structure of the transistor as shown in FIG. 1. The on-current of the transistor refers to a current between the first electrode and the second electrode of the transistor in the case that the transistor is turned on without being irradiated by light.

In some embodiments of the present disclosure, the on-current of the transistor 102 in the first substrate 100 is set to have a same magnitude as the on-current of the reference transistor, in some embodiments, both being 10 microamperes. In this way, it is ensured that the electrical performance of the transistor 102 in the present disclosure is consistent with the electrical performance of the reference transistor. Because the area of the channel region of the reference transistor is only 325 square microns, the ratio of the area of the channel region of the reference transistor to the on-current of the reference transistor is 32.5.

In this way, in the case that the ratio of the area of the orthographic projection of the channel region 102*a* of the transistor 102 on the first base substrate 101 to the on-current of the transistor 102 is greater than 32.5, it is ensured to increase the area of the orthographic projection of the channel region 102*a* of the transistor 102 on the first base substrate 101 on the premise that the electrical performance of the transistor 102 in the present disclosure is consistent with the electrical performance of the reference transistor. That is, the area S2 of the orthographic projection of the channel region 102*a* of the transistor 102 on the first base substrate 101 is greater than the area S1 of the channel region of the reference transistor.

In this case, because the area S2 of the channel region 102*a* of the transistor 102 is large in the present disclosure, more carriers are generated in the active layer 1024 in the channel region 102*a* upon the transistor 102 being irradiated by the target light, and the transistor 102 is turned on more easily, i.e., the liquid crystal handwriting board 000 has a higher sensitivity, resulting in a good erasing effect of the liquid crystal handwriting board 000.

In summary, the embodiments of the present disclosure provide a liquid crystal handwriting board. The liquid crystal handwriting board includes: a first substrate, a second substrate, and a liquid crystal layer. A transistor in the first substrate is electrically connected to a pixel electrode, and the transistor is sensitive to light. The transistor includes a channel region with a large area. Therefore, the transistor is turned on more easily upon irradiation of target light, i.e., the liquid crystal handwriting board has a high sensitivity, resulting in a good erasing effect of the liquid crystal handwriting board. That is, the liquid crystal handwriting board solves the poor erasing effect of the liquid crystal handwriting board in the relate art.

It should be noted that, as shown in FIG. 3, the first substrate 100 in the liquid crystal handwriting board 000 further includes: a gate line 104 and a data line 105. The gate line 104 is electrically connected to the gate electrode 1021 of the transistor 102, the data line 015 is electrically connected to the first electrode 1022 of the transistor 102, and the first electrode 1023 of the transistor 102 is electrically connected to the pixel electrode 103. The transistor 102 is configured to: be turned on upon irradiation of the target light, enable the data line 105 connected to the transistor 102 to apply a pixel voltage to the pixel electrode 103 connected to the transistor 102, and thus create a voltage difference between the pixel electrode 103 to which the pixel voltage is applied and the common electrode 202.

In this case, in the case that the liquid crystal handwriting board 000 is in the erasing mode, all of the gate lines 104 in the liquid crystal handwriting board 000 are applied with the voltage, and the data lines 105 are applied with electrical signals. Here, because the area S2 of the channel region 102a of the transistor 102 is greater than the area S1 of the channel region of the reference transistor, the voltage applied to the gate line 104 is small. In other words, the transistor 102 is ensured to be normally turned on upon being irradiated by the target light of a strong light intensity on the premise that the gate voltage applied to the gate electrode 1021 of the transistor 102 is small. Therefore, in the case that the gate voltage applied to the gate electrode 1021 of the transistor 102 is small, the transistor 102 in the liquid crystal handwriting board 000 is not turned on upon being irradiated by the ambient light of a low light intensity. In this way, the probability of improper erasing on the liquid crystal handwriting board 000 is effectively reduced, and the erasing effect of the liquid crystal handwriting board 000 becomes better.

It should be further noted that one of the first base substrate 101 and the second base substrate 201 in the liquid crystal handwriting board 000 is a flexible base substrate. The flexible base substrate is disposed at a writing side of the liquid crystal handwriting board 000. Here, the writing side of the liquid crystal handwriting board 000 refers to a display side of the liquid crystal handwriting board 000. In this way, the user applies pressure to the flexible base substrate at the writing side of the liquid crystal handwriting board 000 to transform the bistable liquid crystal molecules in the liquid crystal layer 300 from the focal conic texture to the planar texture, such that the liquid crystal handwriting board 000 presents handwriting.

In the embodiments of the present disclosure, various optional implementations are available to enable the area of the channel region 102a of the transistor 102 to be greater than the area of the channel region of the reference transistor. The embodiments of the present disclosure are only illustrated with the following five optional implementations.

It should be noted that, for facilitating a detailed description of the area S2 of the channel region 102a of the transistor 102 in the following embodiments, and for facilitating the understanding of the contents in the following embodiments, the terminology involved in the present disclosure is explained first in the following embodiments.

In the present disclosure, the channel region of the transistor refers to a region of the active layer between a first region in which the active layer contacts the first electrode and a second region in which the active layer contacts the second electrode. A length L of the channel region refers to a distance between the first region and the second region, and a width W of the channel region refers to a smaller one of a length of the first region at a side close to the channel region and a length of the second region at a side close to the channel region. A width-to-length ratio W/L of the channel region of the transistor refers to a ratio of the width W of the channel region of the transistor to the length L of the channel region of the transistor. A larger value of the width-to-length ratio W/L of the channel region indicates a smaller resistance between the first electrode and the second electrode in the transistor, and a larger magnitude of the on-current between the first electrode and the second electrode. Conversely, a smaller value of the width-to-length ratio W/L of the channel region indicates a smaller magnitude of the on-current between the first electrode and the second electrode in the transistor. That is, the magnitude of the on-current between the first electrode and the second electrode in the transistor is directly proportional to the width-to-length ratio W/L of the channel region. Moreover, the on-current of the transistor is further related to a material of the active layer in the transistor, and the material of the active layer 1024 in the transistor 102 in the embodiments of the present disclosure is the same as the material of the active layer in the reference transistor in some embodiments. In this way, the magnitude of the on-current per W/L in the channel region 102a of the transistor 102 in the embodiments of the present disclosure is the same as the magnitude of the on-current per W/L in the channel region of the reference transistor, e.g., both being 0.8 microamperes.

Figure 4:
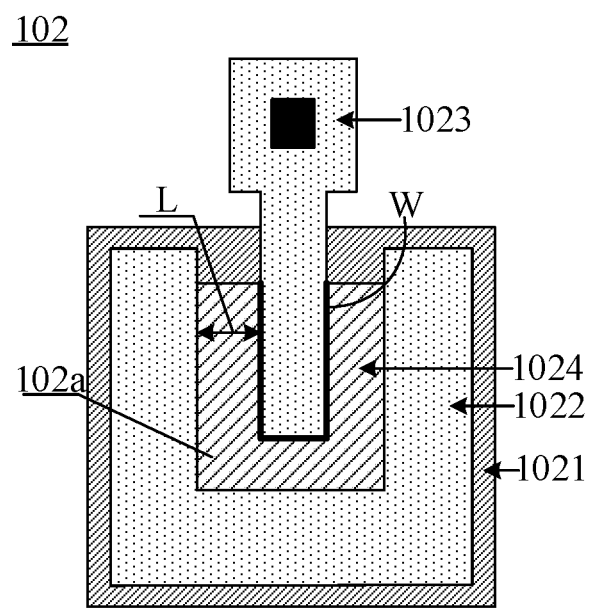
FIG. 4 is a top view of a transistor in a first substrate according to some embodiments of the present disclosure.

Referring to FIG. 4 for a first optional implementation, FIG. 4 is a top view of a transistor in a first substrate according to some embodiments of the present disclosure. The length L of the channel region 102a of the transistor 102 in the first substrate 100 is N times the length of the channel region of the reference transistor, and the width W of the channel region 102a of the transistor 102 is N times the width of the channel region of the reference transistor, wherein N is greater than one. In this way, the area S2 of the channel region 102a of the transistor 102 is N2 times the area S1 of the channel region of the reference transistor. Therefore, the area S2 of the channel region 102a of the transistor 102 is larger, resulting in a good erasing effect of the liquid crystal handwriting board.

In the present disclosure, the on-current E1 of the reference transistor is equal to a product of the width-to-length ratio W/L of the channel region of the reference transistor and a current per unit of the width-to-length ratio of the channel region of the reference transistor. The on-current E2 of the transistor 102 is equal to a product of the width-to-length ratio W/L of the channel region of the transistor 102 and a current per unit of the width-to-length ratio of the channel region of the transistor 102. In some embodiments, in the case that N is equal to two, the width of the channel region of the reference transistor is 50 microns, and the length of the channel region of the reference transistor is 4 microns, the width of the channel region 102a of the transistor 102 is 100 microns and the length of the channel region 102a of the transistor 102 is 8 microns. In this way, the on-current E1 of the reference transistor and the on-current E2 of the transistor 102 satisfy the following relationship:

$$E1 = (50/4)*0.8;$$
$$E2 = (100/8)*0.8; \text{ and}$$
$$E1 = E2.$$

In this case, the area S1 of the channel region of the reference transistor is equal to a product of the length of the channel region of the reference transistor and the width of the channel region of the reference transistor. The area S2 of the channel region of the transistor 102 is equal to a product of the length of the channel region of the transistor and the width of the channel region of the transistor. In some embodiments, the area S1 of the channel region of the reference transistor and the area S2 of the channel region of the transistor 102 satisfy the following relationship:

$$S1 = 50*40;$$

-continued $$S2 = 100*8; \text{ and}$$
$$S2 > S1.$$

In the present disclosure, N is less than or equal to two. Here, a region enclosed by any two adjacent data lines 105 and any two adjacent gate lines 104 in the first substrate 100 is a pixel region. In this way, a larger N indicates a larger area S2 of the channel region of the transistor 102, and thus a larger area of the orthographic projection of the transistor 102 on the first base substrate 101. Therefore, as shown in FIG. 3, because the transistor 102 and the pixel electrode 103 are located in the same pixel region, the area of the orthographic projection of the transistor 102 on the first base substrate 101 cannot be excessively large, so as to effectively avoid the case that the area of the orthographic projection of the pixel electrode 103 on the first base substrate 101 is small which results in a small pixel opening of the liquid crystal handwriting board 000 and further affecting writing and erasing on the liquid crystal handwriting board 000.

Figure 5:
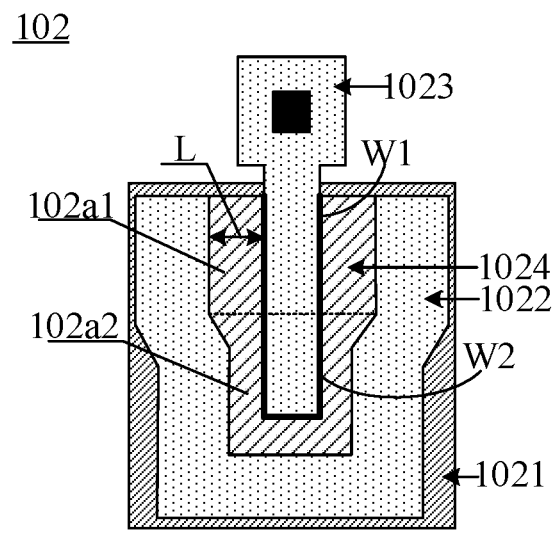
FIG. 5 is a top view of a transistor in another first substrate according to some embodiments of the present disclosure.

Referring to FIG. 5 for a second optional implementation, FIG. 5 is a top view of a transistor in another first substrate according to some embodiments of the present disclosure. The channel region 102a of the transistor 102 includes: a first sub-channel region 102a1 and a second sub-channel region 102a2 that are connected to each other, wherein a length of the first sub-channel region 102a1 is greater than a length of the second sub-channel region 102a2.

The length of the second sub-channel region 102a2 is equal to the length of the channel region of the reference transistor, and a sum of a width-to-length ratio of the first sub-channel region 102a1 and a width-to-length ratio of the second sub-channel region 102a2 is equal to the width-to-length ratio of the reference transistor. Here, because the length of the first sub-channel region 102a1 is greater than the length of the channel region of the reference transistor, and the area S2 of the channel region 102a of the transistor 102 is equal to a sum of an area of the first sub-channel region 102a1 and an area of the second sub-channel region 102a2, the area S2 of the channel region 102a of the transistor 102 is greater than the area S1 of the channel region of the reference transistor.

In the present disclosure, as shown in FIG. 5, the channel region of the transistor 102 is U-shaped, one of the first sub-channel region 102a1 and the second sub-channel region 102a2 includes two sub-channel regions, and the two sub-channel regions are arranged at two sides of the other one of the first sub-channel region 102a1 and the second sub-channel region 102a2. Here, in FIG. 5, it is illustrated by taking an example of the first sub-channel region 102a1 including two sub-channel regions.

In the embodiments of the present disclosure, the two sub-channel regions are both strip-shaped, and the other one of the first sub-channel region 102a1 and the second sub-channel region 102a2 is U-shaped.

Figure 6:
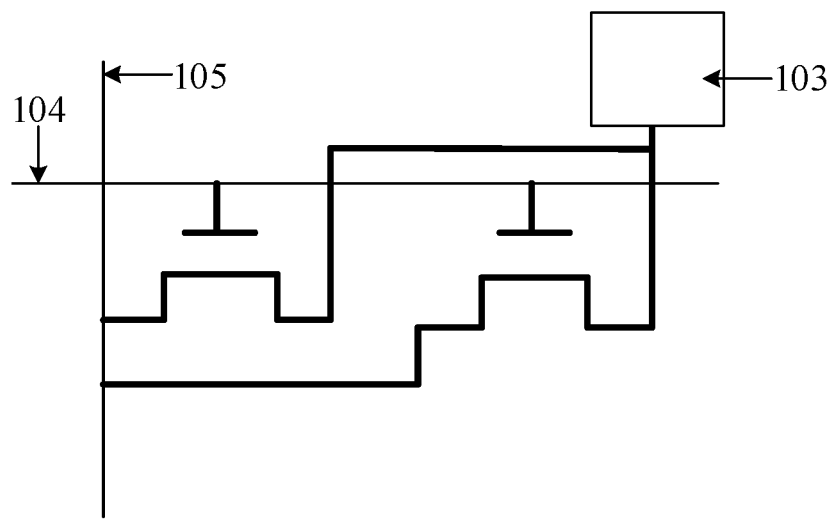
FIG. 6 is a schematic diagram of an equivalent structure of a transistor according to some embodiments of the present disclosure.

In this case, referring to FIG. 6, FIG. 6 is a schematic diagram of an equivalent structure of a transistor according to some embodiments of the present disclosure. In the transistor 102, the first sub-channel region 102a1, a portion of the first electrode 1022 corresponding to the first sub-channel region 102a1, a portion of the second electrode 1023 corresponding to the first sub-channel region 102a1, and a portion of the gate electrode 1021 corresponding to the first sub-channel region 102a1 form a sub-transistor. In the transistor 102, the second sub-channel region 102a2, a portion of the first electrode 1022 corresponding to the second sub-channel region 102a2, a portion of the second electrode 1023 corresponding to the second sub-channel region 102a2, and a portion of the gate electrode 1021 corresponding to the second sub-channel region 102a2 form another sub-transistor. Moreover, the two sub-transistors are connected in parallel.

In the present disclosure, the on-current E1 of the reference transistor is equal to a product of the width-to-length ratio W/L of the channel region of the reference transistor and a current per unit of the width-to-length ratio of the channel region of the reference transistor. The on-current E2 of the transistor 102 is equal to a product of a sum, of the width-to-length ratio of the first sub-channel region 102a1 and the width-to-length ratio of the second sub-channel region 102a2, and a current per unit of the width-to-length ratio of the channel region of the transistor 102, i.e., the on-current E2 of the transistor 102 is equal to a sum of on-currents of the two sub-transistors as described above. In some embodiments, in the case that the width W3 of the channel region of the reference transistor is 50 microns and the length of the channel region of the reference transistor is 4 microns, the length of the first sub-channel region 102a1 of the transistor 102 is 8 microns, the width W1 of the first sub-channel region 102a1 of the transistor 102 is 20 microns, the length of the second sub-channel region 102a2 of the transistor 102 is 4 microns, and the width W2 of the second sub-channel region 102a2 of the transistor 102 is 40 microns. In this way, the on-current E1 of the reference transistor and the on-current E2 of the transistor 102 satisfy the following relationship:

$$E1 = (50/4)*0.8;$$
$$E2 = ((20/8) + (40/4))*0.8; \text{ and}$$
$$E1 = E2.$$

In this case, the area S1 of the channel region of the reference transistor is equal to a product of the length of the channel region of the reference transistor and the width of the channel region of the reference transistor. The area S2 of the channel region of the transistor 102 is equal to a sum of a product, of the length of the first sub-channel region 102a1 of the transistor and the width of the first sub-channel region 102a1, and a product of the length of the second sub-channel region 102a2 and the width of the second sub-channel region 102a2. In some embodiments, the area S1 of the channel region of the reference transistor and the area S2 of the channel region of the transistor 102 satisfy the following relationship:

$$S1 = 50*40;$$
$$S2 = 20*8 + 40*4; \text{ and}$$
$$S2 > S1.$$

In the present disclosure, as shown in FIG. 6, the width W1 of the first sub-channel region 102a1 and the width W2 of the second sub-channel region 102a2 further satisfy the following relationship:

$$W1/M + W2 = W3,$$

wherein W3 represents the width of the channel region of the reference transistor, and M represents a ratio of the length of the first sub-channel region 102a1 to the length of the channel region of the reference transistor, M being greater than one.

In some embodiments of the present disclosure, in the case that the ratio of the length of the first sub-channel region 102a1 to the length of the channel region of the reference transistor is two and the length of the channel region of the reference transistor is 4 microns, the length of the first sub-channel region 102a1 is 8 microns. In this way, in the case that the width W1 of the first sub-channel region 102a1 and the width W2 of the second sub-channel region 102a2 satisfy the above relationship, the on-current E1 of the reference transistor is ensured to be equal to the on-current E2 of the transistor 102.

Figure 7:
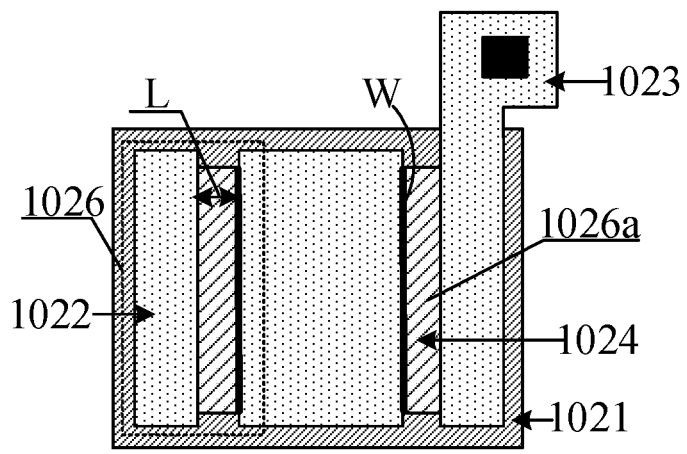
FIG. 7 is a top view of a transistor in still another first substrate according to some embodiments of the present disclosure.
Figure 8:
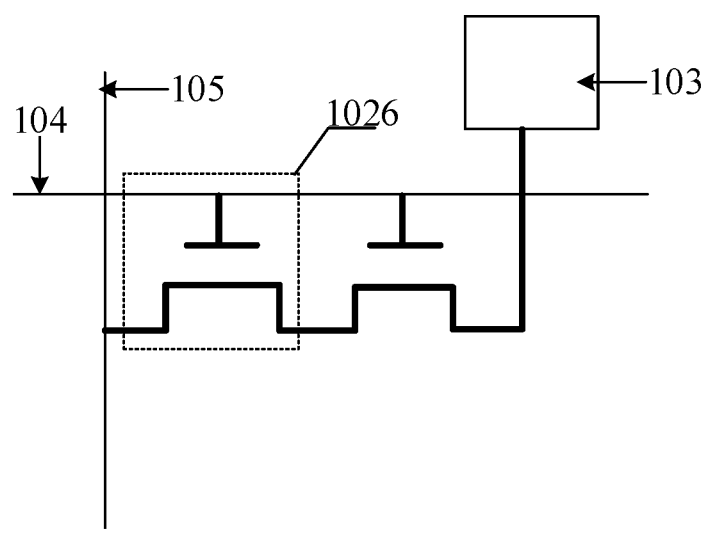
FIG. 8 is a schematic diagram of an equivalent structure of another transistor according to some embodiments of the present disclosure.

Referring to FIG. 7 and FIG. 8 for a third optional implementation, FIG. 7 is a top view of a transistor in still another first substrate according to some embodiments of the present disclosure, and FIG. 8 is a schematic diagram of an equivalent structure of another transistor according to some embodiments of the present disclosure. In some embodiments, the transistor 102 includes: K first sub-transistors 1026 connected in series, wherein each of the first sub-transistors 1026 includes a third sub-channel region 1026a, and the K third sub-channel regions 1026a are separately disposed, K being an integer greater than one.

A length of the third sub-channel region 1026a is equal to the length of the channel region of the reference transistor, and a width of the third sub-channel region 1026a is K times the width of the channel region of the reference transistor. In this way, the area S2 of the channel region 102a of the transistor 102 is equal to a sum of areas of the K third sub-channel regions 1026a. In this way, because the width of the third sub-channel region 1026a is K times the width of the channel region of the reference transistor, the area S2 of the channel region 102a of the transistor 102 is large.

In some embodiments of the present disclosure, each of the third sub-channel regions 1026a is strip-shaped. In this way, K first sub-transistors 1026 connected in series are formed through the K third sub-channel regions 1026a.

In the embodiments of the present disclosure, the on-current E1 of the reference transistor is equal to a product of the width-to-length ratio W/L of the channel region of the reference transistor and a current per unit of the width-to-length ratio of the channel region of the reference transistor. The on-current E2 of the transistor 102 is 1/K of a product of a width-to-length ratio of the third sub-channel region 1026a and a current per unit of the width-to-length ratio of the channel region of the transistor 102. In some embodiments, in the case that the width W3 of the channel region of the reference transistor is 50 microns, the length of the channel region of the reference transistor is 4 microns, and K is equal to two, the lengths of the K third sub-channel regions 1026a are 4 microns and the widths W of the K third sub-channel regions 1026a are 100 microns. In this way, the on-current E1 of the reference transistor and the on-current E2 of the transistor 102 satisfy the following relationship:

$$E1 = (50/4) * 0.8;$$

-continued
$$E2 = ((100/4) * 0.8) * 1/K; \text{ and}$$

$$E1 = E2.$$

In this case, the area S1 of the channel region of the reference transistor is equal to a product of the length of the channel region of the reference transistor and the width of the channel region of the reference transistor. The area S2 of the channel region of the transistor 102 is equal to a sum of areas of the third sub-channel regions 1026a of the K first sub-transistors 1026. The area of the third sub-channel region 1026a is equal to a product of the length of the third sub-channel region 1026a and the width of the third sub-channel region 1026a. In some embodiments, the area S1 of the channel region of the reference transistor and the area S2 of the channel region of the transistor 102 satisfy the following relationship:

$$S1 = 50 * 40;$$

$$S2 = K * (100 * 4); \text{ and}$$

$$S2 > S1.$$

Figure 9:
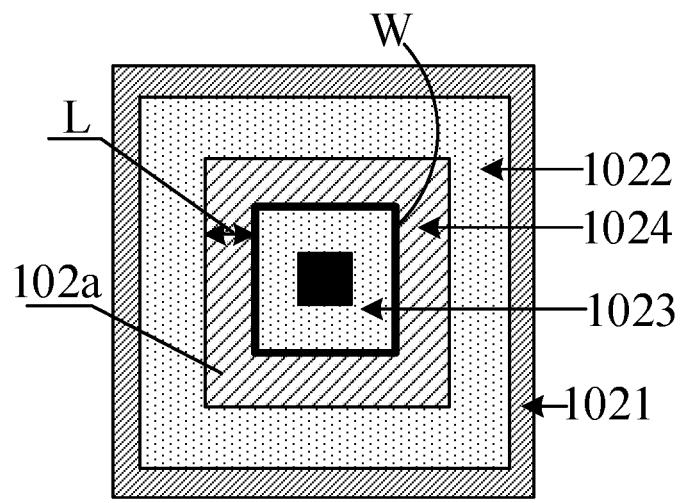
FIG. 9 is a top view of a transistor in yet still another first substrate according to some embodiments of the present disclosure.

Referring to FIG. 9 for a fourth optional implementation, FIG. 9 is a top view of a transistor in yet still another first substrate according to some embodiments of the present disclosure. The channel region 102a of the transistor 102 is annular, the length of the channel region 102a is equal to the length of the channel region of the reference transistor, and the width of the channel region 102a of the transistor 102 is equal to the width of the channel region of the reference transistor.

In some embodiments, the channel region 102a is shaped as a square annular. In this case, the channel region 102a of the transistor 102 is formed by four rectangular regions equal in area and four square regions equal in area, wherein the four rectangular regions are distributed annularly, and each of the square regions is disposed between two adjacent rectangular regions. Here, a length of the rectangular region is ¼ of the width W of the channel region 102a, a width of the rectangular region is equal to the length L of the channel region 102a, and a side length of the square region is equal to the length L of the channel region 102a. Therefore, the area S2 of the channel region 102a of the transistor 102 is equal to a product, of the length L of the channel region 102a and the width W of the channel region 102a, plus four times the square of the length L of the channel region 102a. In this way, the area S2 of the channel region 102a of the transistor 102 is greater than the area S1 of the channel region of the reference transistor.

In the present disclosure, the length of the channel region 102a is equal to the length of the channel region of the reference transistor, and the width of the channel region 102a of the transistor 102 is equal to the width of the channel region of the reference transistor. Therefore, the on-current E1 of the reference transistor is equal to the on-current E2 of the transistor 102. In some embodiments, in the case that the width W3 of the channel region of the reference transistor is 50 microns and the length of the channel region of the reference transistor is 4 microns, the width of the annular channel region 102a is 50 microns and the length of the channel region 102a of the transistor 102 is 4 microns. It should be noted that, the magnitude of the on-current E2 of the channel region 102a of the transistor 102 is calculated with reference to the corresponding content in the above embodiments, which is not repeated in the embodiments of the present disclosure.

In this case, the area S1 of the channel region of the reference transistor is equal to 325 square microns. The area S2 of the channel region of the transistor 102 is equal to 343 square microns.

Figure 10:
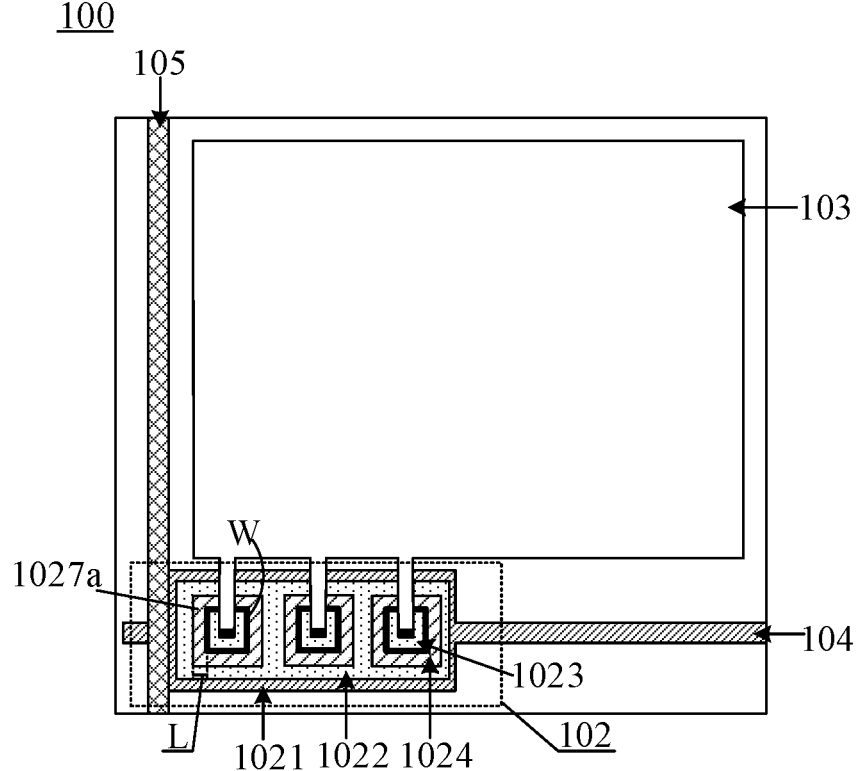
FIG. 10 is a top view of yet another first substrate according to some embodiments of the present disclosure.

Referring to FIG. 10 for a fifth optional implementation, FIG. 10 is a top view of yet another first substrate according to some embodiments of the present disclosure. The transistor 102 includes: J second sub-transistors 1027 connected in parallel, wherein each of the second sub-transistors 1027 includes an annular fourth sub-channel region 1027a, and the J fourth sub-channel regions 1027a are separately disposed, J being an integer greater than one. In some embodiments, the fourth sub-channel region 1027a is shaped as a square annular.

A length of the fourth sub-channel region 1027a is equal to the length of the channel region of the reference transistor, and a sum of widths of the J fourth sub-channel regions 1027a is equal to the width of the channel region of the reference transistor. The area S2 of the channel region 102a of the transistor 102 is equal to a sum of areas of channel regions of the J second sub-transistors 1027. It should be noted that the areas of the channel regions of the second sub-transistors 1027 are calculated with reference to the fourth optional implementation described above, which is not repeated in the embodiments of the present disclosure. In this way, the area S2 of the channel region 102a of the transistor 102 is greater than the area S1 of the channel region of the reference transistor.

In the embodiments of the present disclosure, orthographic projections of the fourth sub-channel regions 1027a on the first base substrate 101 are equal in area, and the width of each of the fourth sub-channel regions 1027a is 1/J of the width of the channel region of the reference transistor. In this way, heights of the J second sub-transistors 1027 are the same. The width of the fourth sub-channel region 1027a in each of the second sub-transistors 1027 is enclosed by four portions equal in length. In some embodiments, the width of each of the fourth sub-channel regions 1027a is equal to a product of 4 and 4.2 microns.

Figure 11:
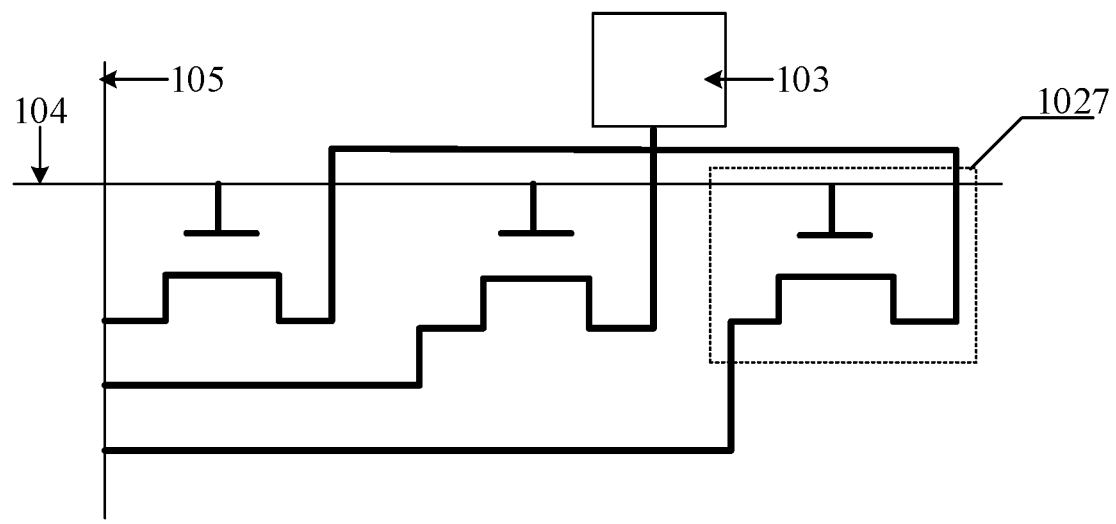
FIG. 11 is a schematic diagram of an equivalent structure of still another transistor according to some embodiments of the present disclosure.

In this case, referring to FIG. 11, FIG. 11 is a schematic diagram of an equivalent structure of still another transistor according to some embodiments of the present disclosure. The on-current E1 of the reference transistor is equal to a product of the width-to-length ratio W/L of the channel region of the reference transistor and a current per unit of the width-to-length ratio of the channel region of the reference transistor. The on-current E2 of the transistor 102 is equal to a sum of on-currents of the J second sub-transistors 1027. In some embodiments, in the case that the width W3 of the channel region of the reference transistor is 50 microns, the length of the channel region of the reference transistor is 4 microns, and J is equal to three, the length of each of the three fourth sub-channel regions 1027a is 4 microns and the sum of the widths of the three fourth sub-channel regions 1027a is 50 microns. The width W of each of the fourth sub-channel regions 1027a is 16.8 microns.

In the embodiments of the present disclosure, for the five optional implementations described above, the calculation formulas for the area S1 of the channel region of the reference transistor and the area S2 of the channel region of the transistor 102 are only illustrative. In this way, it can be seen from the above simple formulas that the area S2 of the channel region of the transistor 102 is increased as compared with the area S1 of the channel region of the reference transistor. It should be noted that the above ratio of the area of the channel region of the reference transistor to the on-current of the reference transistor is 32.5. This is because the reference transistor is the U-shaped transistor as shown in FIG. 3, for which the area of the channel region is 325 square microns, which is a real area of the channel region of an actually produced reference transistor.

In some embodiments of the present disclosure, a difference value, between the ratio of the area S2 of the channel region of the transistor 102 to the on-current E2 of the transistor 102 and the ratio of the area S1 of the channel region of the reference transistor to the on-current E1 of the reference transistor, is greater than or equal to 1.8. In some embodiments of the present disclosure, the difference value, between the ratio of the area S2 of the channel region of the transistor 102 to the on-current E2 of the transistor 102 and the ratio of the area S1 of the channel region of the reference transistor to the on-current E1 of the reference transistor, is less than or equal to 80. In some embodiments, the difference value, between the ratio of the area S2 of the channel region of the transistor 102 to the on-current E2 of the transistor 102 and the ratio of the area S1 of the channel region of the reference transistor to the on-current E1 of the reference transistor, is 30. As such, in the case that the on-current E2 of the transistor and the on-current E1 of the reference transistor are equal to 10 microamperes, the area S2 of the channel region of the transistor 102 is 300 square microns greater than the area S1 of the channel region of the reference transistor. It should be noted that, in other possible implementations, the difference value, between the ratio of the area S2 of the channel region of the transistor 102 to the on-current E2 of the transistor 102 and the ratio of the area S1 of the channel region of the reference transistor to the on-current E1 of the reference transistor, is 40 or 60, which is not repeated in the embodiments of the present disclosure.

In this case, in the case that the on-current E2 of the transistor and the on-current E1 of the reference transistor are equal to 10 microamperes, the area S2 of the channel region of the transistor 102 is at least 18 square microns greater than the area S1 of the channel region of the reference transistor. As such, the transistor 102 is turned on more easily upon irradiation of the target light, resulting in a good erasing effect of the liquid crystal handwriting board 000.

In the embodiments of the present disclosure, the transistor 102 and the pixel electrode 103 are located in the same pixel region. Therefore, the area of the orthographic projection of the transistor 102 on the first base substrate 101 cannot be excessively large. Here, for the five optional implementations described above, the area of the orthographic projection of the transistor 102 on the first base substrate 101 in the third optional implementation is greater than the area of the orthographic projection of the transistor 102 on the first base substrate 101 in the first optional implementation. The area of the orthographic projection of the transistor 102 on the first base substrate 101 in the first optional implementation is greater than the area of the orthographic projection of the transistor 102 on the first base substrate 101 in the fourth optional implementation. The area of the orthographic projection of the transistor 102 on the first base substrate 101 in the fourth optional implementation is greater than the area of the orthographic projection of the transistor 102 on the first base substrate 101 in the second optional implementation. The area of the orthographic projection of the transistor 102 on the first base substrate 101 in the second optional implementation is greater than the area of the orthographic projection of the transistor 102 on the first base substrate 101 in the fifth optional implementation. The area of the orthographic projection of the pixel electrode 103 on the first base substrate 101 is in negative correlation to the area of the orthographic projection of the above transistor 102 on the first base substrate 101. Moreover, for the five optional implementations described above, the area of the channel region of the transistor 102 is in positive correlation to the area of the orthographic projection of the above transistor 102 on the first base substrate 101 in each of the implementations.

In this case, in the case that the liquid crystal handwriting board 000 adopts the structure of the transistor 102 in the third optional implementation, the liquid crystal handwriting board 000 has the highest sensitivity. In the case that the liquid crystal handwriting board 000 adopts the structure of the transistor 102 in the fifth optional implementation, the opening of the pixel electrode 103 is large on the premise that the liquid crystal handwriting board 000 has good sensitivity.

In summary, the embodiments of the present disclosure provide a liquid crystal handwriting board. The liquid crystal handwriting board includes: a first substrate, a second substrate, and a liquid crystal layer. A transistor in the first substrate is electrically connected to a pixel electrode, and the transistor is sensitive to light. The transistor includes a channel region with a large area. Therefore, the transistor is turned on more easily upon irradiation of target light, i.e., the liquid crystal handwriting board has a higher sensitivity, resulting in a good erasing effect of the liquid crystal handwriting board.

It should be noted that, in the accompanying drawings, the dimensions of the layers and regions may be exaggerated for clarity of illustration. Moreover, it should be understood that, in the case that an element or layer is referred to as being "on" another element or layer, it may be directly on the other element, or an intermediate layer may be present. In addition, it should be understood that, in the case that an element or layer is referred to as being "under" another element or layer, it may be directly under the other element, or one or more intermediate layers or elements may be present. In addition, it should be further understood that in the case that a layer or element is referred to as being "between" two layers or elements, it may be the only layer between the two layers or elements, or one or more extra intermediate layers or elements may be present. Like reference numerals refer to like elements throughout the present disclosure.

In the present disclosure, the terms "first" and "second" are merely used for descriptive purposes and should not be construed as indicating or implying the relative importance. The term "a plurality of" refers to two or more, unless otherwise explicitly defined.

Described above are merely optional embodiments of the present disclosure and are not intended to limit the present disclosure. Any modifications, equivalent substitutions, improvements, and the like, made within the concept and principle of the present disclosure fall within the protection scope of the present disclosure.

The invention claimed is:

1. A liquid crystal handwriting board, comprising: a first substrate and a second substrate that are disposed opposite to each other, and a liquid crystal layer disposed between the first substrate and the second substrate, the liquid crystal layer comprising bistable liquid crystal molecules;

wherein the first substrate comprises: a first base substrate, and a transistor and a pixel electrode disposed at a side, proximal to the second substrate, of the first base substrate, the transistor being electrically connected to the pixel electrode;

wherein the transistor comprises a channel region, wherein a ratio of an area of the channel region to an on-current of the transistor is greater than a ratio of an area of a channel region of a reference transistor to an on-current of the reference transistor, the ratio of the area of the channel region of the reference transistor to the on-current of the reference transistor being 32.5.

2. The liquid crystal handwriting board according to claim 1, wherein a length of the channel region of the transistor is N times a length of the channel region of the reference transistor, and a width of the channel region of the transistor is N times a width of the channel region of the reference transistor, wherein N is greater than one.

3. The liquid crystal handwriting board according to claim 2, wherein N is less than or equal to two.

4. The liquid crystal handwriting board according to claim 1, wherein the channel region of the transistor comprises: a first sub-channel region and a second sub-channel region that are connected to each other, a length of the first sub-channel region is greater than a length of the second sub-channel region;

wherein the length of the second sub-channel region is equal to a length of the channel region of the reference transistor; and a sum of a width-to-length ratio of the first sub-channel region and a width-to-length ratio of the second sub-channel region is equal to a width-to-length ratio of the reference transistor.

5. The liquid crystal handwriting board according to claim 4, wherein the channel region of the transistor is U-shaped, one of the first sub-channel region and the second sub-channel region comprises two sub-channel regions, and the two sub-channel regions are arranged at two sides of the other one of the first sub-channel region and the second sub-channel region.

6. The liquid crystal handwriting board according to claim 5, wherein the two sub-channel regions are both strip-shaped, and the other one of the first sub-channel region and the second sub-channel region is U-shaped.

7. The liquid crystal handwriting board according to claim 4, wherein a width W1 of the first sub-channel and a width W2 of the second sub-channel region satisfy the following relationship:

$$W1/M + W2 = W3,$$

wherein W3 represents a width of the channel region of the reference transistor, and M represents a ratio of the length of the first sub-channel region to the length of the channel region of the reference transistor, wherein M is greater than one.

8. The liquid crystal handwriting board according to claim 1, wherein the transistor comprises: K first sub-transistors connected in series, wherein each of the first sub-transistors comprises a third sub-channel region, and the K third sub-channel regions are separately disposed, K being an integer greater than one;

wherein a length of the third sub-channel region is equal to a length of the channel region of the reference transistor, and a width of the third sub-channel region is K times a width of the channel region of the reference transistor.

9. The liquid crystal handwriting board according to claim 8, wherein each of the third sub-channel regions is strip-shaped.

10. The liquid crystal handwriting board according to claim 1, wherein the channel region of the transistor is annular, a length of the channel region of the transistor is equal to a length of the channel region of the reference transistor, and a width of the channel region of the transistor is equal to a width of the channel region of the reference transistor.

11. The liquid crystal handwriting board according to claim 10, wherein the channel region of the transistor is shaped as a square annular.

12. The liquid crystal handwriting board according to claim 1, wherein the transistor comprises: J second sub-transistors connected in parallel, wherein each of the second sub-transistors comprises an annular fourth sub-channel region, and the J fourth sub-channel regions are separately disposed, J being an integer greater than one;

wherein a length of the fourth sub-channel region is equal to a length of the channel region of the reference transistor, and a sum of widths of the J fourth sub-channel regions is equal to a width of the channel region of the reference transistor.

13. The liquid crystal handwriting board according to claim 12, wherein the fourth sub-channel regions are equal in area, and the width of each of the fourth sub-channel regions is 1/J of the width of the channel region of the reference transistor.

14. The liquid crystal handwriting board according to claim 12, wherein the fourth sub-channel region is shaped as a square annular.

15. The liquid crystal handwriting board according to claim 1, wherein the on-current of the transistor has a same magnitude as the on-current of the reference transistor.

16. The liquid crystal handwriting board according to claim 1, wherein the first substrate further comprises: a gate line and a data line, wherein the gate line is electrically connected to a gate electrode of the transistor, and the data line is electrically connected to a first electrode of the transistor, wherein a second electrode of the transistor is electrically connected to the pixel electrode.

17. The liquid crystal handwriting board according to claim 16, wherein the second substrate comprises: a second base substrate and a common electrode disposed at a side, proximal to the first substrate, of the second base substrate, wherein one of the first base substrate and the second base substrate is a flexible base substrate; and the transistor is configured to: be turned on upon irradiation of target light, enable the data line connected to the transistor to apply a pixel voltage to the pixel electrode connected to the transistor, and thus create a voltage difference between the pixel electrode to which the pixel voltage is applied and the common electrode.

18. The liquid crystal handwriting board according to claim 17, wherein the flexible base substrate is disposed at a writing side of the liquid crystal handwriting board.

19. The liquid crystal handwriting board according to claim 1, wherein a difference value between the ratio of the area of the channel region of the transistor to the on-current of the transistor and the ratio of the area of the channel region of the reference transistor to the on-current of the reference transistor is greater than or equal to 1.8.

20. The liquid crystal handwriting board according to claim 19, wherein the difference value between the ratio of the area of the channel region of the transistor to the on-current of the transistor and the ratio of the area of the channel region of the reference transistor to the on-current of the reference transistor is less than or equal to 80.

\* \* \* \* \*